（12）United States Patent
Huebner et al.

(10) Patent No.: US 7,926,557 B2
(45) Date of Patent: Apr. 19, 2011

(54) RADIANT PANEL

(75) Inventors: Fritz Huebner, Holland, MI (US); Kelly Van Koevering, Zeeland, MI (US)

(73) Assignee: Plascore, Inc., Zeeland, MI (US)

( * ) Notice: Subject to any disclaimer, the term of this patent is extended or adjusted under 35 U.S.C. 154(b) by 882 days.

(21) Appl. No.: 11/551,420

(22) Filed: Oct. 20, 2006

(65) Prior Publication Data
US 2007/0039609 A1 Feb. 22, 2007

Related U.S. Application Data

(63) Continuation-in-part of application No. 10/651,474, filed on Aug. 29, 2003, now Pat. No. 7,140,426.

(51) Int. Cl.
F28F 3/12 (2006.01)
(52) U.S. Cl. .......................... 165/170; 165/53
(58) Field of Classification Search ............ 165/53, 165/54, 55, 56, 57, 135, 168, 169, 170
See application file for complete search history.

(56) References Cited

U.S. PATENT DOCUMENTS

| | | | |
|---|---|---|---|
| 1,800,150 A | | 4/1931 | Musgrave et al. |
| 1,833,291 A | | 11/1931 | Kraenzlein et al. |
| 2,612,351 A | * | 9/1952 | Janos ............... 165/78 |
| 2,615,308 A | * | 10/1952 | Thorns ............ 165/56 |
| 2,718,383 A | * | 9/1955 | Frenger ........... 165/56 |
| 2,862,692 A | * | 12/1958 | Wolf ................ 165/56 |
| 3,072,183 A | * | 1/1963 | Barbier et al. ... 165/55 |
| 3,120,869 A | | 2/1964 | Carpenter |
| 3,265,121 A | | 8/1966 | Hickman |
| 3,269,459 A | | 8/1966 | Popovitch |
| 3,514,834 A | | 6/1970 | Beck, Jr. |
| 3,698,475 A | | 10/1972 | Beck, Jr. |
| 3,703,758 A | | 11/1972 | Beck, Jr. |
| 3,776,538 A | | 12/1973 | Beck, Jr. |
| 3,973,103 A | | 8/1976 | Tadewald |
| 4,074,406 A | | 2/1978 | Boyd et al. |
| 4,080,703 A | | 3/1978 | Beck, Jr. |
| 4,083,093 A | | 4/1978 | Chertok |
| 4,109,859 A | * | 8/1978 | Durst ............... 237/69 |
| 4,122,830 A | | 10/1978 | Hapgood |
| 4,209,059 A | | 6/1980 | Anthony et al. |
| 4,301,859 A | | 11/1981 | Hollemann |

(Continued)

FOREIGN PATENT DOCUMENTS
DE 1923137 9/1965
(Continued)

OTHER PUBLICATIONS

Krantz Technology GMBH, "Cooling and heating systems, 2.1 SKS-4/1 static cooling ceiling system," www.krantz.de, p. 1-12, 2003.

(Continued)

Primary Examiner — Teresa J Walberg
(74) Attorney, Agent, or Firm — Price, Heneveld, Cooper, DeWitt & Litton, LLP

(57) ABSTRACT

A radiant panel includes a first and second skins and a fluid conduit between the first and second skins. The first and second skins each include an inner face and an outer face. The fluid conduit is formed in multiple rows, and is positioned within thermally conducting brackets bonded to an inner face of at least one of the skins. The thermally conducting brackets provide a thermally conducting path between the fluid conduit and the first and second skins of the radiant panel.

24 Claims, 7 Drawing Sheets

U.S. PATENT DOCUMENTS

| | | | |
|---|---|---|---|
| 4,635,710 A | | 1/1987 | Shelley |
| 4,646,814 A | * | 3/1987 | Fennesz ............. 165/56 |
| 4,766,951 A | | 8/1988 | Bergh |
| 5,261,251 A | | 11/1993 | Galiyano |
| 5,363,908 A | | 11/1994 | Koster |
| 5,495,724 A | | 3/1996 | Koster |
| 5,666,820 A | | 9/1997 | Homm et al. |
| 5,740,649 A | | 4/1998 | Fuchs et al. |
| 5,799,723 A | | 9/1998 | Sokolean |
| 5,930,962 A | | 8/1999 | Sokolean |
| 5,957,378 A | | 9/1999 | Fiedrich |
| 5,964,284 A | | 10/1999 | Ikejima et al. |
| 5,996,354 A | | 12/1999 | Sokolean et al. |
| 6,073,407 A | | 6/2000 | Sokolean |
| 6,092,587 A | * | 7/2000 | Ingram ............. 165/56 |
| 6,152,377 A | | 11/2000 | Fiedrich |
| 6,220,523 B1 | | 4/2001 | Fiedrich |
| 6,263,690 B1 | | 7/2001 | Sokolean et al. |
| 6,330,980 B1 | | 12/2001 | Fiedrich |
| 6,726,115 B1 | * | 4/2004 | Chiles et al. ............. 237/69 |
| 6,739,097 B1 | * | 5/2004 | Rodin ............. 52/71 |
| 6,923,248 B1 | * | 8/2005 | Weber et al. ............. 165/56 |

FOREIGN PATENT DOCUMENTS

| | | |
|---|---|---|
| DE | 1978367 | 2/1968 |
| DE | 2759770 B1 | 2/1981 |
| DE | 3015961 A1 | 11/1981 |
| DE | 3032968 A1 | 3/1982 |
| DE | 3500880 A1 | 8/1985 |
| DE | 4201553 A1 | 11/1992 |
| DE | 4132870 A1 | 4/1993 |
| DE | 4400562 A1 | 9/1994 |
| EP | 0278489 A1 | 2/1988 |
| EP | 0568523 A2 | 4/1993 |
| EP | 0769659 A1 | 4/1997 |
| EP | 0772006 A2 | 5/1997 |
| EP | 0786570 A1 | 7/1997 |
| EP | 0859097 A1 | 8/1998 |
| FR | 2618212 A1 | 1/1989 |
| GB | 2298914 A | 9/1996 |
| GB | 2397642 A | 7/2004 |

OTHER PUBLICATIONS

Krantz Technology GMBH, "Cooling and heating systems, 2.2 SKS-5/1 static cooling ceiling system," www.krantz.de, p. 1-16, 2003.

Krantz Technology GMBH, "Cooling and heating systems, 3.1 Contact cooling ceiling system KKS-1 for metal ceilings," www.krantz.de, p. 1-14, 2003.

Krantz Technology GMBH, "Cooling and heating systems, 3.2 Contact cooling ceiling system KKS-2 for gypsum plasterboard ceilings," www.krantz.de, p. 1-14, 2003.

* cited by examiner

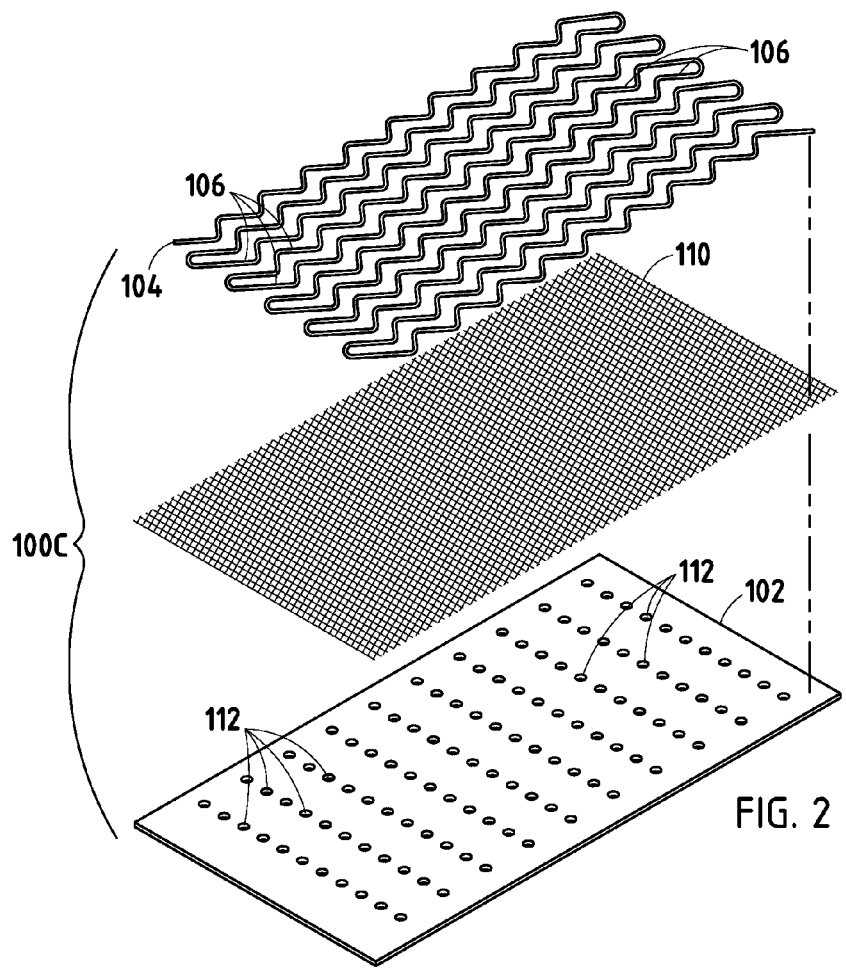
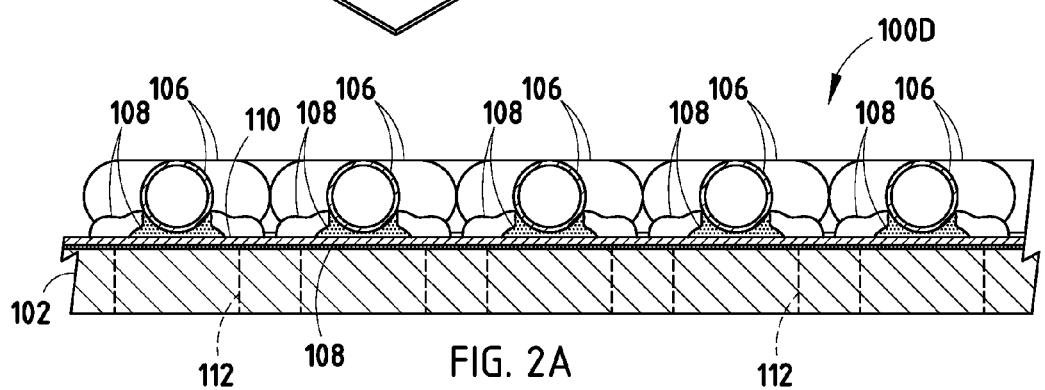
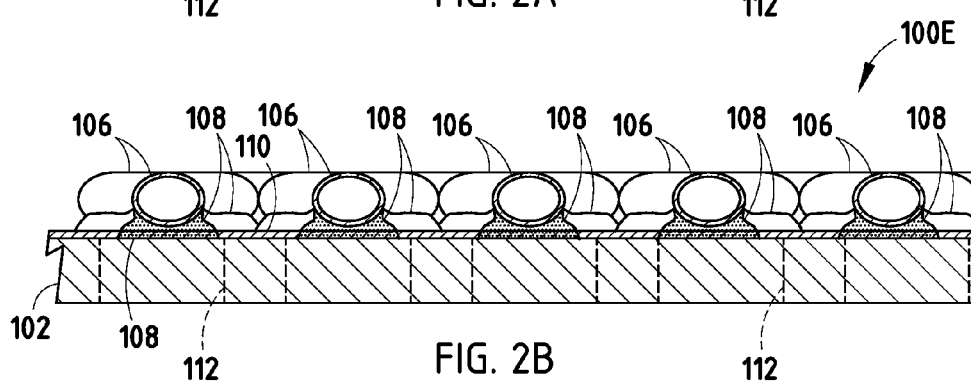

RADIANT PANEL

CROSS-REFERENCE TO RELATED APPLICATION

This application is a continuation-in-part of U.S. patent application Ser. No. 10/651,474, entitled "RADIANT PANEL" filed on Aug. 29, 2003 now U.S. Pat. No. 7,140,426, by Fritz Huebner et al., the entire disclosure of which is incorporated herein by reference.

BACKGROUND OF THE INVENTION

The present invention is generally directed to a radiant panel and, more specifically, to a radiant panel that can be used for heating and/or cooling a building.

A number of U.S. patents disclose radiant panels that may be implemented within a building. For example, U.S. Pat. No. 4,635,710 discloses a radiant panel that includes an extruded aluminum plate member that has a saddle adapted to receive and retain a copper tube having fluid circulating therein. The extruded plate members have channels on each side of the saddle to receive a fastener and connect the plates to a supporting grid structure in a room.

U.S. Pat. No. 4,083,093 discloses a solar panel that is made of different interior and exterior materials to utilize the structural and heat absorbing properties of the exterior material and a corrosion resistant property of the interior material. The exterior material is formed by extrusion to have diametrically extending fins, one of which terminates in a socket so that a plurality of such panels can be readily assembled in edge-to-edge relation.

U.S. Pat. No. 4,080,703 discloses a heat exchanger that takes the form of a heat radiating absorbing panel that includes an aluminum panel having a copper tube attached thereto in a heat exchange relationship. The panel has at least one pair of parallel spaced retainer legs, which have angularly inwardly extending flanges. A copper tube of circular cross-section is laid into the channel formed by the retainer legs and then is squashed by a die into a generally oval cross-section so as to be confined within the retainer legs.

U.S. Pat. No. 3,973,103 discloses a wood veneer radiant heating panel that incorporates an internal layer of semiconductive carbonaceous pyropolymer, consisting of carbon and hydrogen on a high surface area refractory inorganic oxide support, to provide electrical resistance radiant heating. U.S. Pat. Nos. 3,776,538; 3,703,758; 3,698,475; and 3,514,834 disclose a method and apparatus for securing an elongated member, e.g., a metallic tubing, to a flat sheet of metal.

U.S. Pat. No. 5,957,378 discloses a hydronic heating system that includes a thermally conductive plate mounted in a floor or wall that includes tubing that is maintained in relationship with a subfloor by heat transfer plates. U.S. Pat. No. 5,740,649 discloses a false ceiling for buildings that is designed to absorb acoustic waves and has perforated plates.

U.S. Pat. No. 6,073,407 discloses a plurality of panels that include a central longitudinal groove for receiving a pipe. U.S. Pat. No. 5,930,962 discloses a panel and a tube, which is attached to a plate, with a variety of differently formed guides and/or guide webs.

U.S. Pat. No. 5,799,723 discloses a ceiling element for a heating and cooling ceiling that has a guide for holding a conduit, through which a heat transfer medium flows, and a contact surface for making contact with the ceiling panel. U.S. Pat. No. 5,666,820 discloses a cooling ceiling pipe support apparatus for air conditioning a room with a system of cooling pipes. The apparatus includes a hole in the element connected to the ceiling of the building and a plurality of connecting elements, which accommodates a respectively assigned region of one of heating cooling pipes.

U.S. Pat. No. 5,495,724 discloses a cooling system, which can be fastened to a ceiling with a suspension provided beneath the ceiling, disposed above a space to be cooled and with cooling pipes between the ceiling and the suspension. The space to be cooled and the space between the ceiling and the suspension are connected through air current paths.

U.S. Pat. No. 5,363,908 discloses a heating and cooling arrangement that is suspended from a room ceiling. U.S. Pat. No. 4,766,951 discloses a radiant panel, which has an external panel shell, which can be used as a passive panel, and an extruded aluminum radiator panel resting in the shell, with an outward side in contact with the shell and an inward side in contact with a copper tube, which acts as a fluid conduit.

U.S. Pat. No. 4,074,406 discloses a solar energy collector that includes a thin sheet of copper laminated to a layer of insulating foam, which in turn is laminated to a backing plate of pressed wood. A soft copper tube is pressed against a laminated assembly and the copper tube and the sheet are bonded together to produce a collector panel. U.S. Pat. No. 4,209,059 discloses an aluminum clad radiator core with a brazing alloy joining a tube to the core.

U.S. Pat. No. 6,263,690 discloses a cooling element that is supported by a floor stand that is readily detachable from a floor such that the cooling element is capable of being relocated to different locations. U.S. Pat. No. 5,261,251 discloses a cooling and heating system for a building. U.S. Pat. No. 5,996,354 discloses a cooling element that is fitted into a ceiling region. U.S. Pat. No. 6,330,980 discloses a heating element that includes a radiant metal plate that is in contact with a link of tubing that conducts water. U.S. Pat. No. 6,152,377 also discloses a radiant floor for a wall hydronic heating system that includes a tube attached to a radiant plate.

While the above-described cooling/heating panels/systems function, depending upon the application, the above-described panels can be quite expensive and difficult to implement in numerous applications as the weight of a given panel may be relatively heavy in order to meet the rigidity requirements of certain applications. What is needed is a radiant panel that is relatively inexpensive, lightweight and that maintains rigidity in a number of different applications, such as wall, ceiling, and floor panels.

SUMMARY OF THE INVENTION

According to one embodiment of the present invention, a radiant panel includes a first skin including an outer face and an inner face, a second skin including an outer and inner face, brackets comprising thermally conducting material, and a fluid conduit formed in multiple rows between the first and second skins. The brackets are bonded to the inner face of the first skin. The fluid conduit is positioned within and retained by the brackets.

According to another embodiment of the present invention, a radiant panel includes a first skin including an outer face and an inner face, a second skin including an outer and inner face, extruded brackets comprising thermally conducting material, and a fluid conduit formed in multiple rows between the first and second skins. The brackets include lower portions bonded to the inner face of the first skin, and upper portions bonded to the inner face of the second skin. The fluid conduit is positioned between the upper and lower portions of the brackets. A core material is positioned between the multiple rows of fluid conduit.

According to still another embodiment of the present invention, a radiant panel includes a first skin including an outer face and an inner face, a second skin including an outer and inner face, extruded brackets comprising thermally conducting material, and a fluid conduit formed in multiple rows between the first and second skins. The brackets are bonded to at least one of the inner face of the first skin and the inner face of the second skin. The fluid conduit is positioned within and retained by the brackets. A core material is positioned between the multiple rows of fluid conduit.

These and other features, advantages and objects of the present invention will be further understood and appreciated by those skilled in the art by reference to the following specification, claims and appended drawings.

BRIEF DESCRIPTION OF THE DRAWINGS

In the drawings:

FIG. 2 is an exploded view of a radiant panel, including a first skin, a fluid conduit and a veil with perforations in the first skin, according to yet another embodiment of the present invention;

FIG. 2A is a cross-sectional view of a radiant panel, including a perforated first skin, a fluid conduit and a veil with an adhesive on both sides of the veil, according to yet another embodiment of the present invention;

FIG. 2B is a cross-sectional view of a radiant panel, including a first skin, a fluid conduit and a veil with an adhesive extending through the veil, according to still another embodiment of the present invention;

DETAILED DESCRIPTION OF THE PREFERRED EMBODIMENTS

A number of radiant panels are described herein, which can generally be fabricated from lightweight thinner materials than prior art radiant panels without sacrificing structural rigidity, thus, allowing for the panels to be used economically in a number of different cooling/heating applications. It should be appreciated that many of the embodiments of the present invention, disclosed herein, may be utilized as ceiling, floor, and/or wall panels.

Figure 1:
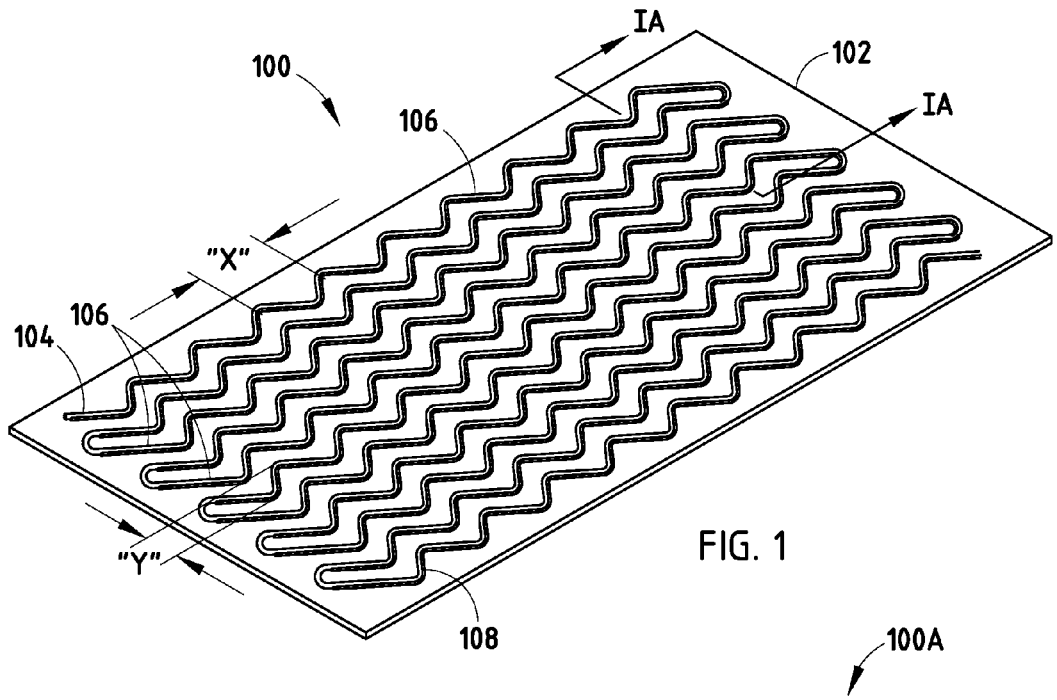
FIG. 1 is a perspective view of a radiant panel, including a first skin and a fluid conduit, according to one embodiment of the present invention.

With reference to FIG. 1, a radiant panel 100 is depicted, which includes a first skin 102, having an outer face and an inner face. A fluid conduit 104, which is formed in multiple rows 106, is positioned on the inner face of the first skin, with at least a portion of the fluid conduit bonded 108 to the inner face of the first skin 102. As is shown in FIG. 1, each row 106 of the fluid conduit 104 has a serpentine configuration that provides structural support, e.g., transverse shear resistance, for the first skin 102. The fluid conduit 104 may be formed of various materials, e.g., copper or stainless steel. According to another embodiment of the present invention, the serpentine configuration of each of the rows 106 traverses the first skin with a length that is about twice a width for each segment. That is, as shown, the 'X' distance is about twice the 'Y' distance, with the 'X' distance defining a segment.

The first skin 102 may be made of a variety of materials, such as a wood, a metal, a metal with a wood or plastic veneer, a thermally conductive plastic material, a ceramic material, a natural stone material or a glass pane. In any case, the fluid conduit 104 may be bonded 108 to the inner face of the first skin 102 with an adhesive. When the fluid conduit 104 is a metallic tube, e.g., a copper tube, and when the first skin 102 is a sheet metal, the fluid conduit 104 may be bonded 108 to the inner face of the first skin 102 with a nonferrous solder or an adhesive. The fluid conduit 104 may have one of a circular, an elliptical, a square, or a rectangular cross-section, among other cross-sections. In general, panels with a fluid conduit having an elliptical or rectangular cross-section are more rigid and have a thinner profile as more of the fluid conduit is bonded to the skin.

Figure 1A:
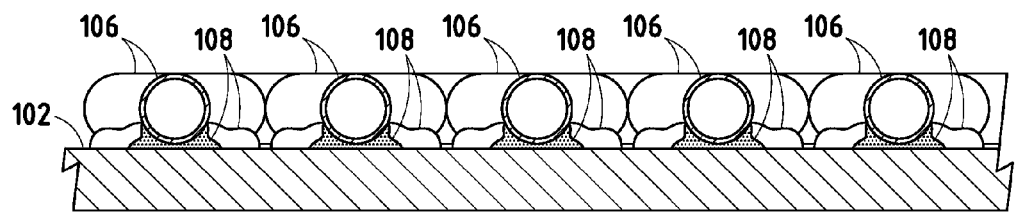
FIG. 1A is a cross-sectional view of a radiant panel along the line IA-IA of FIG. 1, including a first skin and a fluid conduit, according to another embodiment of the present invention.
Figure 1B:
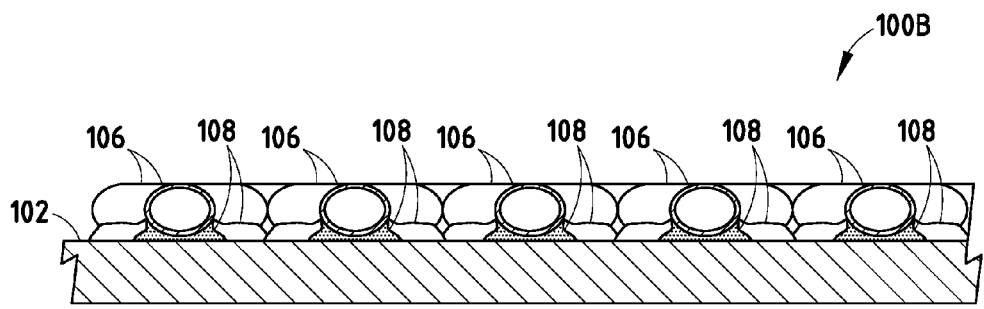
FIG. 1B is a cross-sectional view of a radiant panel, including a first skin and a fluid conduit, according to yet another embodiment of the present invention.

With reference to FIG. 1A, which depicts a cross-section of a radiant panel 100A constructed according to one embodiment of the present invention, the rows 106 and the fluid conduit 104 have a circular cross-section and are bonded 108 to the inner surface of the first skin 102 with an adhesive or, depending upon the type of materials utilized, the bond 108 may be achieved with a nonferrous solder. With reference to FIG. 1B, another radiant panel 100B is depicted in cross-section. The radiant panel 100B of FIG. 1B is essentially the same as the radiant panel 100A of FIG. 1A, with the exception that the rows 106 of the fluid conduit 104 have an elliptical cross-section.

As is shown in FIG. 2, a radiant panel 100C includes a first skin 102 with a plurality of spaced apertures 112 formed through the first skin 102. The radiant panel 100C also includes a veil 110, which visually screens (with respect to an observer looking through the apertures 112 in the first skin 102 toward the fluid conduit 104) the fluid conduit 104 and may provide sound deadening. A veil may be made of a variety of materials, e.g., a fabric or a non-woven polyester sheet. The use of a veil can be particularly advantageous in rooms with a high level of noise as the radiant panel 100C may also act to reduce the ambient noise level. Alternatively, the apertures 112 may be positioned such that the veil 110 is not required for visual screening.

With reference to FIG. 2A, another radiant panel 100D is depicted in cross-section. The radiant panel 100D is similar to the radiant panel 100C of FIG. 2 and depicts a bond 108 formed by an adhesive positioned on opposite sides of the veil 110. That is, the adhesive attaches one side of the veil 110 to the inner face of the first skin 102 and an opposite side of the veil 110 to the fluid conduit 104. With reference to FIG. 2B, a cross-sectional view of yet another radiant panel 100E is depicted. As shown, the radiant panel 100E includes a fluid conduit 104 with an elliptical cross-section. An adhesive that penetrates the veil 110 forms the bond 108 that attaches the fluid conduit 104 to the inner face of the first skin 102.

Figure 3:
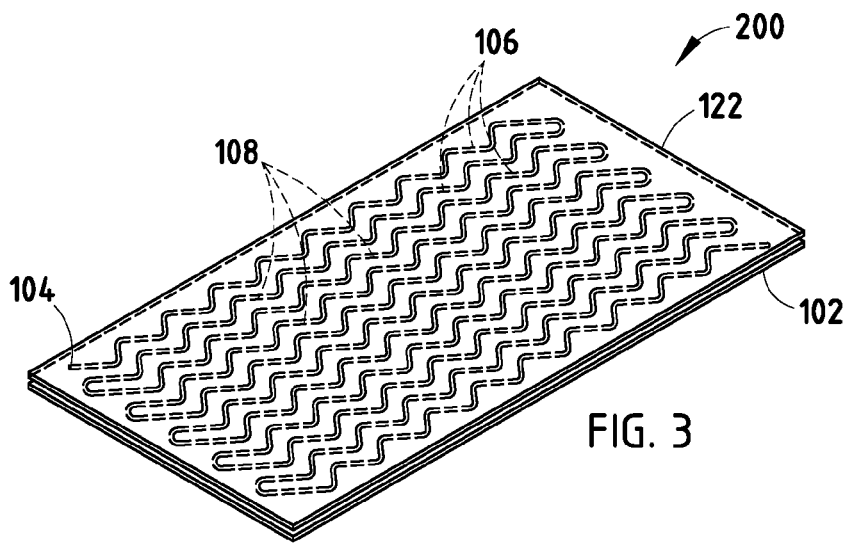
FIG. 3 is a perspective view of a radiant panel, including a fluid conduit positioned between a first skin and a second skin, according to an embodiment of the present invention.

FIG. 3 depicts a perspective view of a radiant panel 200 that includes a second skin 122, in addition to the first skin 102 and the fluid conduit 104. In this embodiment, the fluid conduit 104 is positioned between the first skin 102 and the second skin 122. Each row 106 of the fluid conduit 104 has a serpentine configuration similar to that shown in FIG. 1. Alternatively, each of the rows 106 may be straight if the additional support provided by the serpentine configuration is not required. In either case, a core material, e.g., a honeycomb core, a foam, rockwool or fiberglass, may also be added in desired locations between the first skin 102 and the second skin 122 and in between the rows 106. The filler materials, e.g., foam, rockwool, and fiberglass, when implemented, may function to provide increased sound deadening. A first portion of the fluid conduit 104 is bonded to the inner face of the first skin 102 and a second portion of the fluid conduit 104 is bonded to the inner face of the second skin 122.

Suitable honeycomb cores are manufactured and made commercially available by Plascore, Inc. of Zeeland, Mich. (e.g., Part No. 5052). Honeycomb cores have been widely used in the fabrication of lightweight structures used in the aerospace and commercial markets. A honeycomb core is typically sandwiched between skins of aluminum or other high strength composite material to provide a resultant honeycomb core panel. In aerospace applications, aircraft engine nacelles, flaps, overhead bins, and galleys are typically constructed from honeycomb core.

Similar to FIG. 1, in at least one embodiment, the serpentine configuration of each of the rows traverses the first skin 102 and the second skin 122 with a length that is about twice a width, for each segment, to provide additional structural integrity to the panel 200. It should be appreciated that the rows 106 of the fluid conduit 104 may also be nested to provide additional structural integrity. The first skin 102 and the second skin 122 may be made of a variety of materials, e.g., a wood, a metal, a metal with a wood or plastic veneer, a thermally conductive plastic material, a ceramic material, a natural stone material or a glass pane, or a combination thereof. In any case, the fluid conduit 104 may be bonded to the inner faces of the first skin 102 and the second skin 122 with an adhesive. Alternatively, when the first skin 102 and the second skin 122 are made of a metallic sheet and the fluid conduit 104 is made of a metal, the fluid conduit 104 may be bonded to the inner faces of the first skin 102 and the second skin 122 with a nonferrous solder.

Figure 3A:
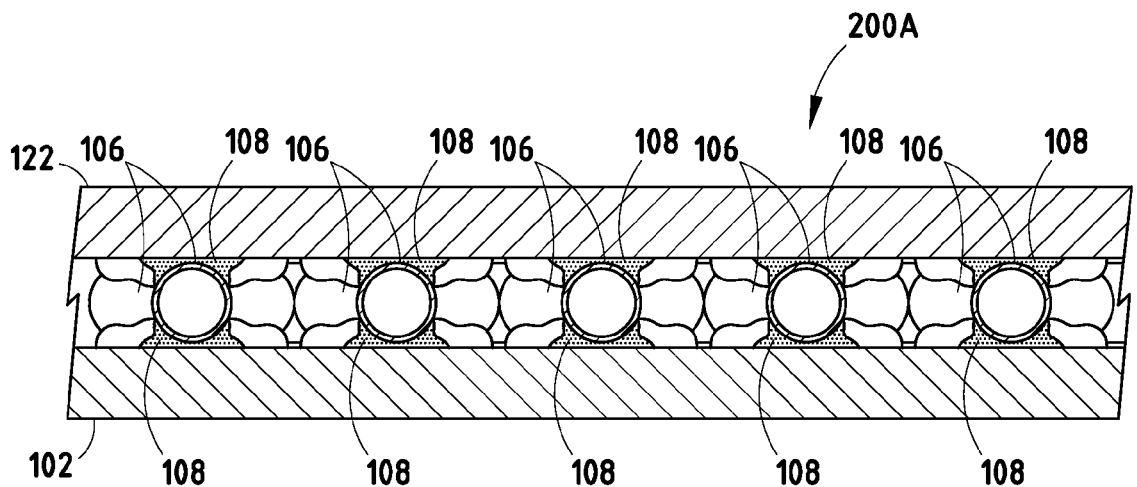
FIG. 3A is a cross-sectional view of a radiant panel, including a fluid conduit positioned between a first and second skin, according to another embodiment of the present invention.
Figure 3B:
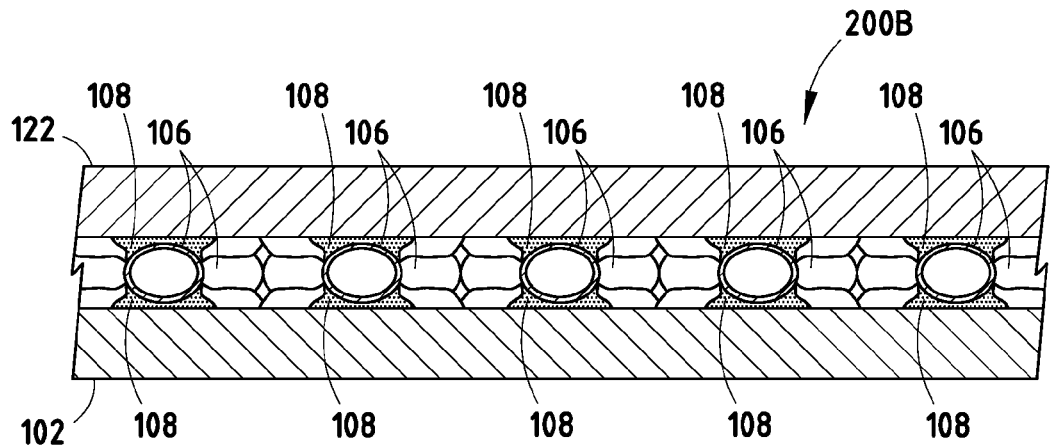
FIG. 3B is a cross-sectional view of a radiant panel, including a fluid conduit positioned between a first and second skin, according to a different embodiment of the present invention.

FIG. 3A shows a cross-sectional view of a radiant panel 200A that includes a first skin 102, a second skin 122, and a fluid conduit 104 having a circular cross-section and formed in a plurality of rows 106 positioned between the first and second skins 102 and 122. A first portion of the fluid conduit 104 is bonded 108 to an inner surface of the first skin 102 and a second portion of the fluid conduit 104 is bonded 108 to an inner surface of the second skin 122. As discussed above, depending upon the materials used for the first and second skins 102 and 122 and the fluid conduit 104, the bond 108 may be achieved with an adhesive or a nonferrous solder. As is shown, each of the rows 106 of the fluid conduit 104 has a serpentine configuration. Alternatively, each of the rows 106 of the fluid conduit 104 may be straight, in applications that do not require additional structural rigidity provided by the serpentine configuration. With reference to FIG. 3B, a radiant panel 200B is essentially the same as the embodiment of FIG. 3A, with the exception that the embodiment of 3B includes a fluid conduit 104 that has an elliptical cross-section. It should be appreciated that other cross-sections, e.g., a rectangular or square cross-section, for the fluid conduit 104 may be desirable in certain applications.

Figure 4:
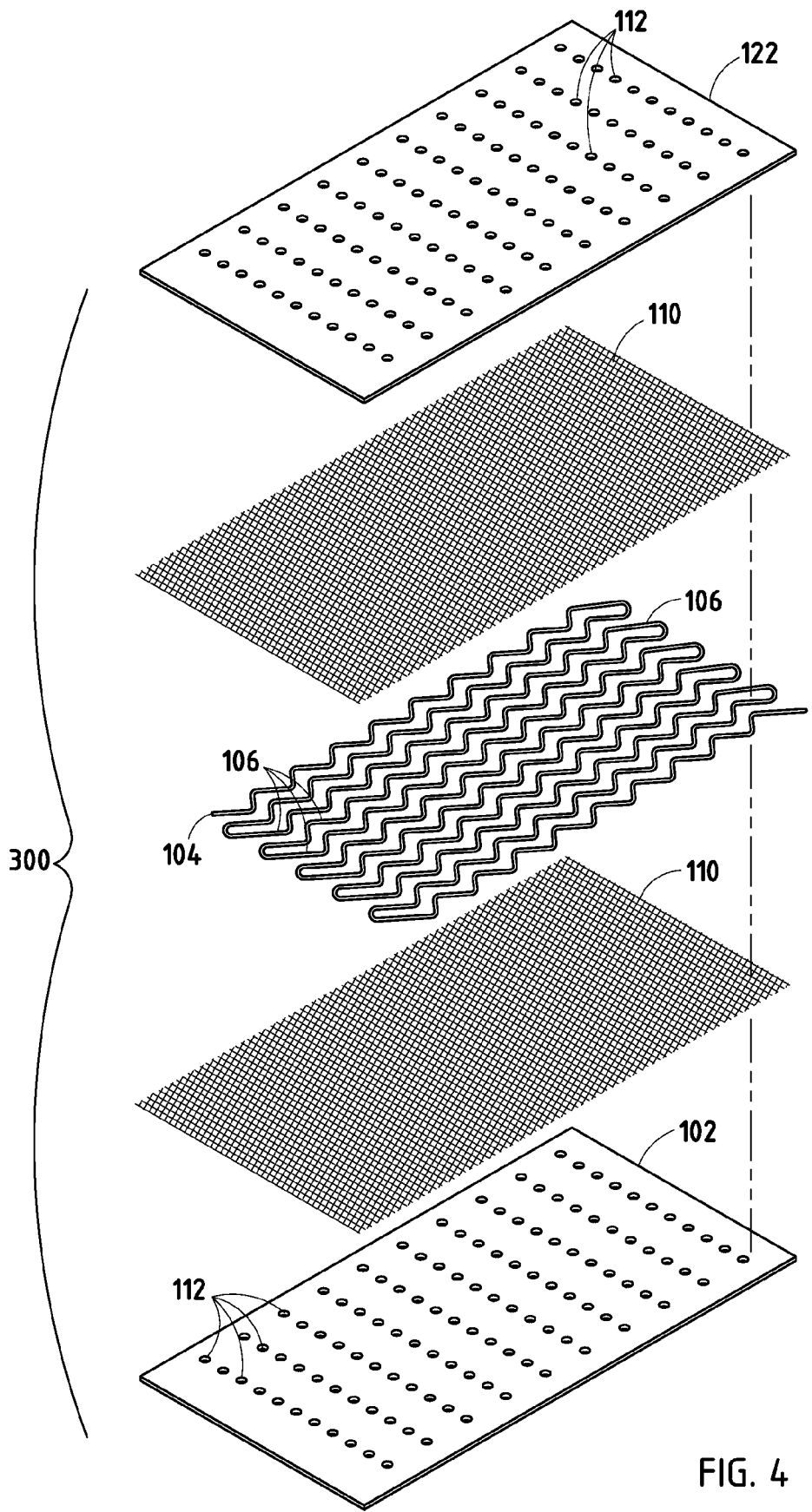
FIG. 4 is an exploded view of a radiant panel, including a fluid conduit positioned between perforated first and second skins and first and second veils.

With reference to FIG. 4, a radiant panel 300 includes a perforated first skin 102, a perforated second skin 122, and a fluid conduit 104, formed in multiple rows 106, positioned between the first skin 102 and the second skin 122. The radiant panel 300 also includes a pair of veils 110. A first veil 110 is positioned between an inner face of the first skin 102 and the fluid conduit 104 and a second veil 110 is positioned between the second skin 122 and the fluid conduit 104. As is discussed above, the veils 110 visually screen the fluid conduit 104 and may provide sound deadening. Alternatively, when the perforations are positioned between the rows 106, the veils 110 may not be required for visual screening. Additionally, the perforations in the skins 102 and 122 may be of different sizes and/or non-existent in at least one of the skins 102 and 122. In either case, a core material, e.g., a honeycomb core, a foam, rockwool or fiberglass, may also be added in desired locations between the first skin 102 and the second skin 122 and in between the rows 106 to achieve a desired function. As is discussed further below, a first portion of the fluid conduit 104 is bonded to an inner face of the first skin 102 and a second portion of the fluid conduit is bonded to an inner face of the second skin 122.

Figure 4A:
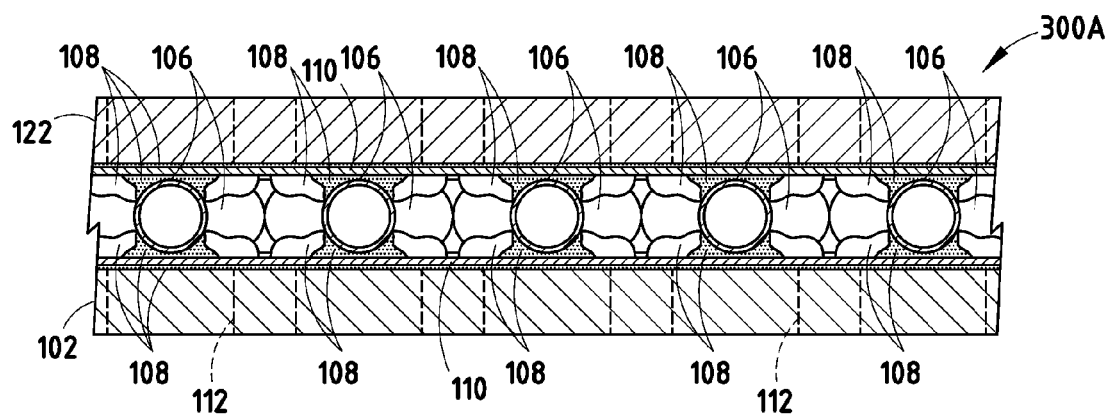
FIG. 4A is a cross-sectional view of a radiant panel, including perforated first and second skins, with first and second veils positioned to obscure the view of the fluid conduit positioned between the first and second skins, according to one embodiment.
Figure 4B:
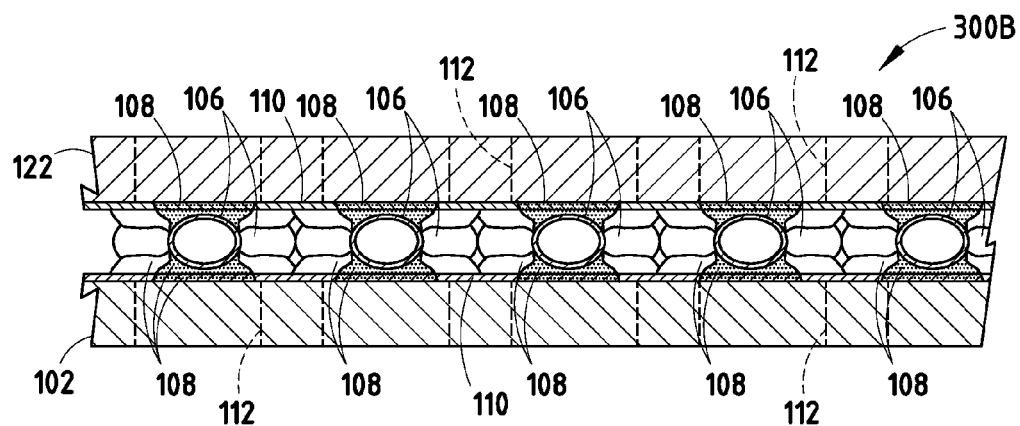
FIG. 4B is a cross-sectional view of a radiant panel, including perforated first and second skins, with first and second veils positioned to obscure the view of the fluid conduit positioned between the first and second skins, according to another embodiment.

FIG. 4A depicts a radiant panel 300B in cross-section where bonds 108 are formed by an adhesive that is placed on both sides of the veils 110. That is, the adhesive 108 does not extend through the veils 110. FIG. 4B depicts a cross-sectional view of a radiant panel 300A, where the bonds 108 are formed by an adhesive that extends through the veils 110.

Figure 5A:
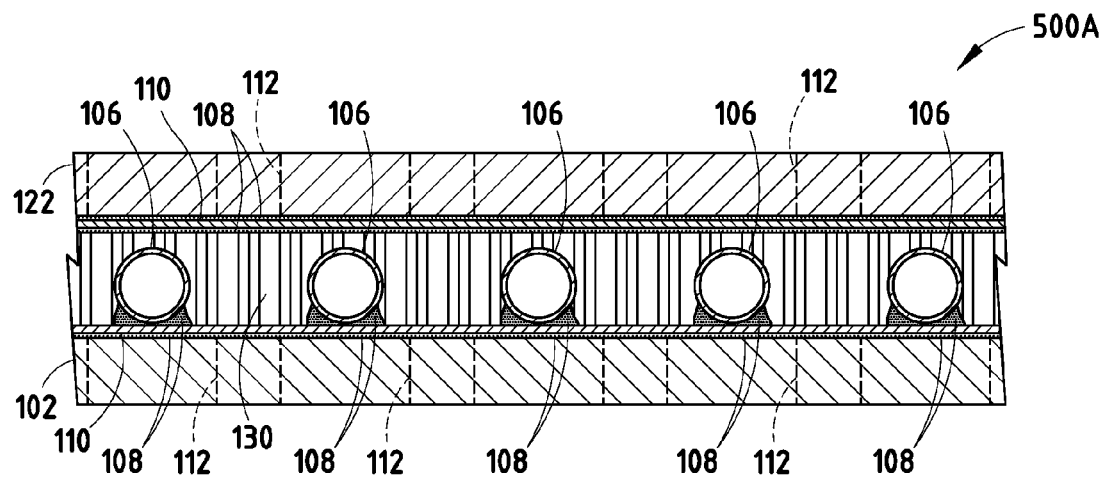
FIG. 5A is a cross-sectional view of a portion of a radiant panel, including perforated first and second skins, between which are positioned a fluid conduit and a core material, according to an embodiment of the present invention.

With reference to FIG. 5A, a radiant panel 500A, according to another embodiment of the present invention, is depicted. Similar to the panels previously described, a cross-sectional view of panel 500A shows multiple rows 106 of a fluid conduit positioned between a first skin 102 and a second skin 122. However, in this embodiment, the rows 106 are generally not formed in a serpentine configuration as a honeycomb core, which is positioned between the first skin 102 and the second skin 122, may be implemented to provide structural support for the radiant panel 500A. Alternatively, the honeycomb core may be replaced with a foam, rockwool, or fiberglass (for sound deadening) in applications that do not require additional structural support.

The first skin 102 includes an inner face and an outer face and the second skin 122 includes an inner face and an outer face. The fluid conduit is formed in multiple rows 106 with at least a portion of the fluid conduit being adjacent to the inner face of the first skin 102. The core material 130, for example, an aluminum honeycomb core, is positioned between the first skin 102 and the second skin 122 and the fluid conduit 104 is positioned between the core material 130 and the first skin 102. The core material 130 may be positioned, removed, or deformed to receive the fluid conduit 104. As described above, the first skin 102 and the second skin 122 may also be made of at least one of a wood, a metal, a metal with a wood or plastic veneer, a thermally conductive plastic, a ceramic material, a natural stone material, and a glass pane.

Figure 5B:
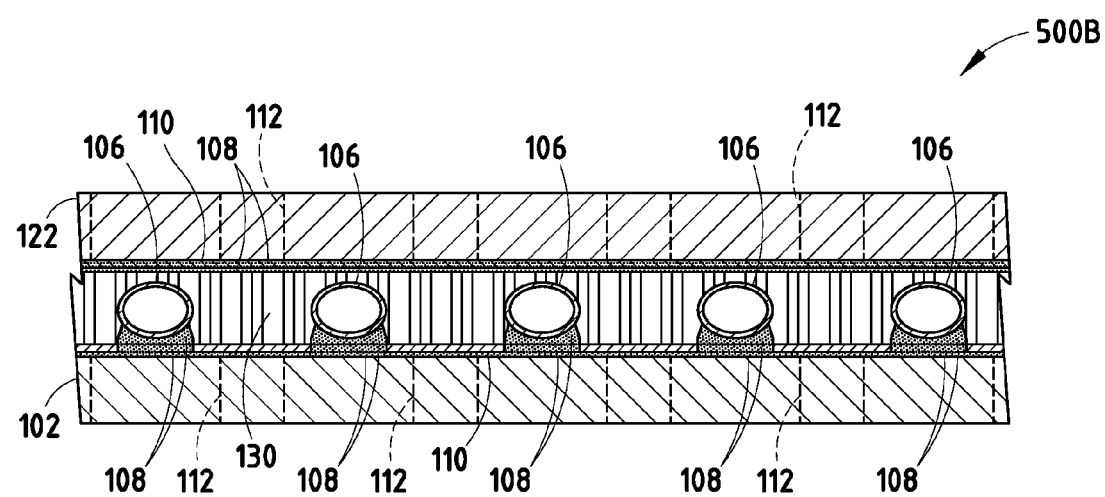
FIG. 5B is a cross-sectional view of a radiant panel, including perforated first and second skins, between which is positioned a core material and a fluid conduit, according to another embodiment of the present invention.

As is also shown in FIG. 5A, the first skin 102 and the second skin 122 include a plurality of apertures 112 formed therethrough. A pair of veils 110 are utilized to visually conceal the core material 130 and the fluid conduit 104, as would be seen through the apertures 112 in the first and second skins 102 and 122. When the core material 130 is a honeycomb core, an adhesive bonds 108 the honeycomb core to the top veil 110 and the top veil 110 to the top skin 122 and the fluid conduit 104 to the bottom veil 110 and the bottom veil 110 to the first skin 102. That is, an adhesive applied to opposite sides of the top and bottom veils 110 provides the bond 108. FIG. 5B depicts a radiant panel 500B in cross-section, which is essentially the same as the radiant panel 500A of FIG. 5A, with the exception that the adhesive extends through the veils 110 to achieve the bond 108.

Figure 6:
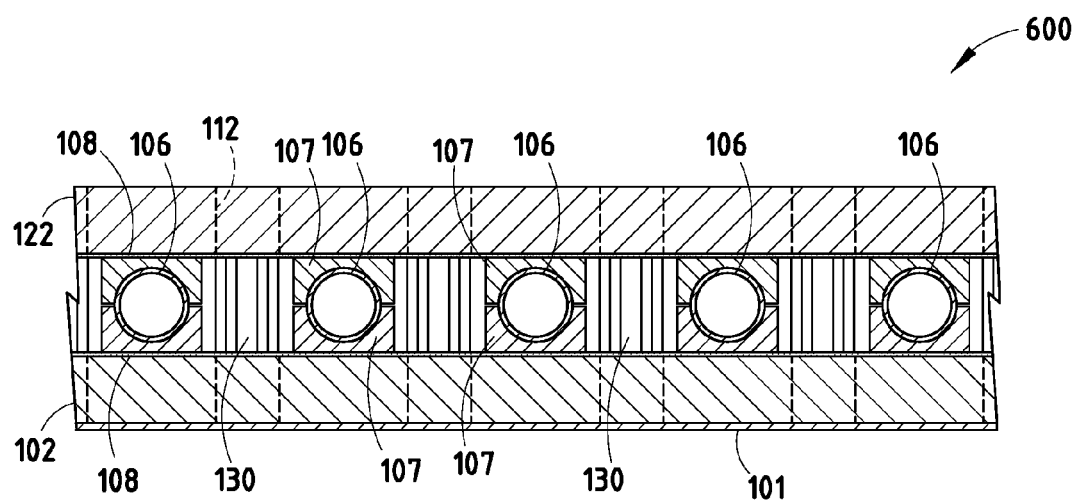
FIG. 6 is a cross-sectional view of a radiant panel according to another embodiment of the present invention.
Figure 7:
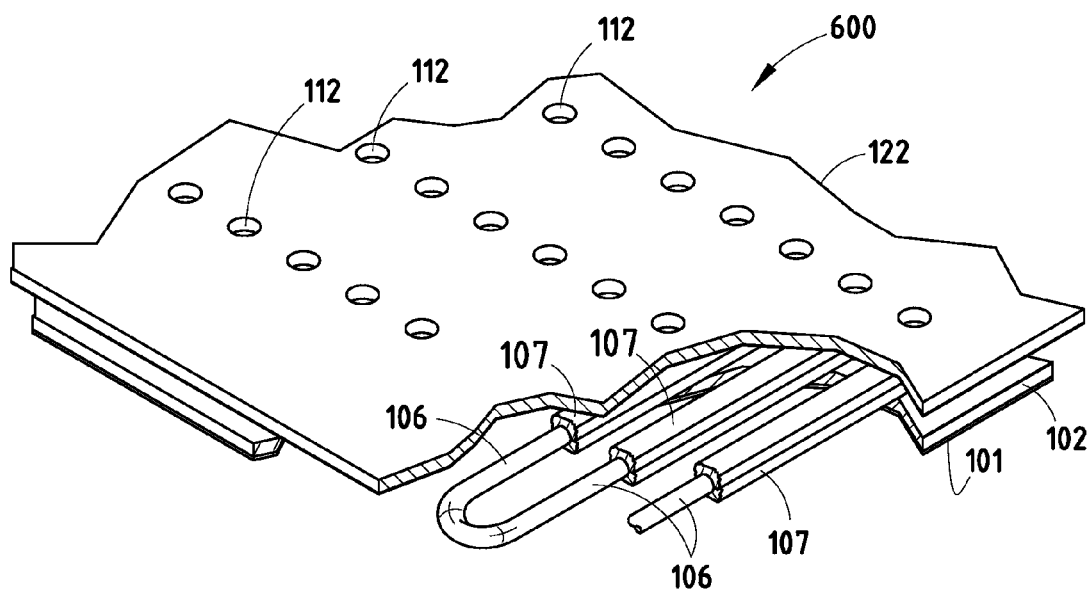
FIG. 7 is a perspective view of a radiant panel according to the embodiment of FIG. 6.

FIGS. 6 and 7 depict a radiant panel 600, constructed according to another embodiment of the present invention. As shown, a fluid conduit including multiple rows 106 is positioned between a first skin 102 and a second skin 122. In the present embodiment, first skin 102 and second skin 122 are made of metal. In alternate embodiments, first skin 102 and/or second skin 122 may be made of other material, such as, for example, wood, metal with wood or plastic veneer, thermally conductive plastic, ceramic, natural stone material, glass, or other materials. In the present embodiment, the fluid conduit is one continuous conduit including multiple rows 106 that are sections of conduit that are generally straight and parallel to each other, and including curved sections joining the generally straight sections at the ends of the multiple rows 106. In alternate embodiments, the fluid conduit may be made up of various separate pieces of fluid conduit that have been joined together, and may have various shapes and cross-sections. A core material 130, shown positioned between the first skin 102 and the second skin 122, provides structural support and/or sound deadening for the radiant panel 600. When the material 130 is to provide structural support, the material 130 may be an aluminum or plastic honeycomb core. When additional structural support is not required, the material 130 may be filler material, such as a foam, rockwool, or fiberglass, which tends to perform additional sound deadening.

The first skin 102 includes an inner face and an outer face and the second skin 122 includes an inner face and an outer face. The fluid conduit is formed in multiple rows 106 with at least a portion of the fluid conduit being located within brackets 107. In the present embodiment, the brackets 107 are two-piece elongated brackets having an upper portion adjacent the inner face of second skin 122, and a lower portion adjacent the inner face of first skin 102. The upper and lower portions of the brackets 107 are extruded aluminum, and are configured such that they are secured together and enclose the straight sections of the fluid conduit. The brackets 107 are shaped such that when the upper and lower portions of the brackets are secured together, the straight sections of fluid conduit fit securely within the brackets, and such that the amount of surface area of the fluid conduit enclosed by and in contact with the brackets 107 is maximized. In one preferred embodiment, the fluid conduit has a circular cross section, and the brackets 107 have an inner circular cross section sized such that the amount of outer surface area of fluid conduit in contact with the inner surface of the brackets 107 is maximized. In an alternate embodiment, the fluid conduit has an elliptical cross section, and the brackets 107 have an inner elliptical cross section sized such that the amount of outer surface are of fluid conduit in contact with the inner surface of the brackets 107 is maximized.

In one embodiment, the upper and lower portions of the brackets 107 are configured to interlock with each other to secure the fluid conduit between the upper and lower portions of the brackets 107. In alternate embodiments, the upper and lower portions of the brackets 107 are secured together by an adhesive, or by means of an epoxy or solder. In still another alternate embodiment, the upper and lower portions of the brackets 107 are secured to the fluid conduit by an adhesive, an epoxy, or by soldering, welding, or brazing. In the present embodiment, the brackets 107 are configured such that much of the outer surface area of the fluid conduit is enclosed by the brackets 107. In one preferred embodiment, the size, shape and length of the brackets 107 is such that at least 50% of the outer surface area of the fluid conduit is enclosed by, and in contact with, the brackets 107. In a more preferred embodiment, at least 75% of the outer surface area of the fluid conduit is enclosed by, and in contact with, the brackets 107. In a most preferred embodiment, at least 90% of the outer surface area of the fluid conduit is enclosed by, and in contact with, the brackets 107. It should be appreciated that the higher the percentage of fluid conduit enclosed in the brackets 107, the greater the thermal transfer between the fluid conduit, the brackets 107, and the skins 102 and 122 to which the brackets 107 are secured.

Although in the present embodiment, the brackets 107 are extruded aluminum brackets, it should be appreciated that in alternate embodiments, the brackets 107 could be extruded metal, extruded plastic, or another extruded material that is thermally conductive. In yet another alternate embodiment, the brackets 107 may be made of a thermally conductive material that is not extruded. As shown, the brackets 107 are secured to the inner faces of the first skin 102 and second skin 122 by a bond 108. In the present embodiment, the bond 108 is a solder. In alternate embodiments, the bond 108 may be an adhesive, an epoxy, a weld, a glue, a braze, or other means for securing the brackets 107 to the skins 102 and 122. In still another alternate embodiment, the brackets 107 may be formed as an integral part of first skin 102 and/or second skin 122.

As shown in FIG. 6, the material 130, such as, for example, an aluminum honeycomb core, is positioned between the first skin 102 and the second skin 122, and between the rows 106 of fluid conduit and the brackets 107 enclosing the multiple rows 106 of fluid conduit. In the present embodiment, the material 130 is secured to inner surfaces of the first skin 102 and the second skin 122 by a bond 108. In the present embodiment, the bond 108 is a solder. In alternate embodiments, the bond 108 may be an adhesive, an epoxy, a weld, a glue, a braze, or other means for securing the material 130 to the skins 102 and 122. As mentioned above, the first skin 102 and the second skin 122 may also be made of at least one of a wood, a metal, a metal with a wood or plastic veneer, a thermally conductive plastic, a ceramic material, a natural stone material, and a glass pane. As also shown in FIG. 6, the outer surface of the first skin 102 is coated with a plastic film 101. In alternate embodiments, the outer surface of the first skin 102 may be coated with a veneer or stone, or may be uncoated.

As is also shown in FIGS. 6 and 7, the first skin 102 and the second skin 122 include a plurality of apertures 112 formed therethrough, which may be positioned between the rows 106 of the fluid conduit. A pair of veils (not shown) may also be utilized to visually conceal the material 130 and the fluid conduit as would be seen through the apertures 112 in the first and second skins 102 and 122. In one alternate embodiment, a first veil is positioned between the first skin 102 and the brackets 107, and a second veil is positioned between the second skin 122 and the brackets 107. In this alternate embodiment, the first veil is secured to the inner surface of the first skin 102 by an adhesive, the second veil is secured to the inner surface of the second skin 122 by an adhesive, and brackets 107 and material 130 are secured to the inner surfaces of the first and second veils by an adhesive. In alternate embodiments, veil may be joined to other components using an epoxy, or by soldering, welding, or brazing. Instead of being distinct components from skins 102 and 122, the brackets 107 may be integrated with the inner faces of the first and second skins 102 and 122. More specifically, the lower portions of brackets 107 may be integrated with first skin 102, and the upper portions of brackets 107 may be integrated with second skin 122.

Accordingly, a number of different radiant panels have been described herein, which advantageously provide a relatively rigid panel that is lightweight and economical and that can be utilized in a variety of different applications, for example, wall panels, ceiling panels and floor panels.

The above description is considered that of the preferred embodiments only. Modifications of the invention will occur to those skilled in the art and to those who make or use the invention. Therefore, it is understood that the embodiments shown in the drawings and described above are merely for illustrative purposes and not intended to limit the scope of the invention, which is defined by the following claims as interpreted according to the principles of patent law, including the doctrine of equivalents.

What is claimed is:

1. A radiant panel, comprising:
a first skin including an outer face and an inner face;
a second skin including an outer face and an inner face;
thermally conducting brackets bonded to the inner face of said first skin;
a fluid conduit formed of sections configured in multiple rows and positioned between said first and second skins, said fluid conduit having an outer surface area, wherein said thermally conducting brackets are configured to receive corresponding sections of said fluid conduit, and wherein at least 50% of the outer surface area of said fluid conduit is positioned within said thermally conducting brackets; and
a core material positioned between said multiple rows of fluid conduit and extending between said first and second skins,
wherein said thermally conducting brackets comprise separate upper and lower portions, and wherein the lower portions of said thermally conducting brackets are bonded to the inner face of said first skin, and wherein the upper portions of said thermally conducting brackets are bonded to the inner face of said second skin, and wherein corresponding sections of said fluid conduit are positioned between said upper and lower portions of said thermally conducting brackets.

2. The radiant panel of claim 1, wherein said thermally conducting brackets comprise metal.

3. The radiant panel of claim 2, wherein said thermally conducting brackets comprise aluminum.

4. The radiant panel of claim 1, wherein said thermally conducting brackets are extruded brackets.

5. The radiant panel of claim 1, wherein said core material comprises at least one of foam, rockwool, fiberglass, and a honeycomb material.

6. The radiant panel of claim 5, wherein said core material comprises a honeycomb material that is at least one of a metallic and plastic.

7. The radiant panel of claim 1, wherein said first and second skins are made of at least one of a wood, a metal, a metal with one of a wood and plastic veneer, a thermally conductive plastic material, a ceramic material, a natural stone material and a glass pane, and wherein said thermally conducting brackets are bonded to the inner face of said first skin with an adhesive.

8. The radiant panel of claim 1, wherein said first and second skins are made of at least one of a wood, a metal, a metal with one of a wood and plastic veneer, a thermally conductive plastic material, a ceramic material, a natural stone material and a glass pane, and wherein said lower portions of said thermally conducting brackets are bonded to the inner face of said first skin with an adhesive, and wherein the upper portions of said thermally conducting brackets are bonded to the inner face of said second skin with an adhesive.

9. The panel of claim 1, wherein said first skin includes a plurality of spaced apertures.

10. The panel of claim 1, wherein said first and second skins include a plurality of spaced apertures.

11. The panel of claim 9, further comprising a visually screening veil positioned between said first skin and said thermally conducting brackets.

12. The panel of claim 10, further comprising a first visually screening veil positioned between said first skin and said thermally conducting brackets and a second visually screening veil positioned between said second skin and said thermally conducting brackets.

13. The panel of claim 1, wherein at least 75% of the outer surface area of said fluid conduit is positioned within and retained by said thermally conducting brackets.

14. The panel of claim 1, wherein at least 90% of the outer surface area of said fluid conduit is positioned within and retained by said thermally conducting brackets.

15. The panel of claim 1, wherein said core material comprises a honeycomb material.

16. The panel of claim 5, wherein said second skin is made of a material that is different from said core material.

17. A radiant panel, comprising:
a first skin including an outer face and an inner face;
a second skin including an outer face and an inner face;
thermally conducting extruded brackets comprising lower portions bonded to the inner face of said first skin and separate upper portions bonded to the inner face of said second skin;
a fluid conduit formed of sections configured in multiple rows positioned between said first and second skins, said fluid conduit having an outer surface area, wherein said upper and lower portions of said thermally conducting brackets are configured to receive and retain corresponding sections of said fluid conduit between them, and wherein at least 50% of the outer surface area of said fluid conduit is positioned between and retained by the upper and lower portions of said thermally conducting extruded brackets; and
a core material comprising at least one of foam, rockwool, fiberglass and a honeycomb material positioned between said multiple rows of fluid conduit and extending between said first and second skins.

18. The radiant panel of claim 17, wherein at least 90% of the outer surface area of said fluid conduit is positioned between and retained by the upper and lower portions of said thermally conducting extruded brackets.

19. The panel of claim 17, wherein said second skin is made of a material that is different from said core material.

20. A radiant panel, comprising:
a first skin including an outer face and an inner face;
a second skin including an outer face and an inner face;
thermally conducting extruded brackets having separate upper and lower portions bonded to at least one of the inner face of said first skin and the inner face of said second skin,
a fluid conduit formed of sections configured in multiple rows positioned between said first and second skins, said fluid conduit having an outer surface area, wherein said brackets are configured to receive and retain corresponding sections of said fluid conduit, and wherein at least 50% of the outer surface area of said fluid conduit is positioned within and retained by said thermally conducting extruded brackets; and
a core material comprising at least one of foam, rockwool, fiberglass and a honeycomb material positioned between said multiple rows of fluid conduit and extending between said first and second skins.

21. The panel of claim 20, wherein at least 90% of the outer surface area of said fluid conduit is positioned within and retained by said thermally conducting extruded brackets.

22. The panel of claim 20, wherein said second skin is made of a material that is different from said core material.

23. The panel of claim 20, wherein said thermally conducting extruded brackets are bonded to the inner face of said first skin, and said core material is positioned between said fluid conduit and said second skin.

24. The panel of claim 23, wherein said core material comprises a honeycomb material.

* * * * *